United States Patent [19]
Georgalis

[11] Patent Number: 4,740,967
[45] Date of Patent: Apr. 26, 1988

[54] DISPERSED SWITCHING TELECOMMUNICATION SYSTEM

[76] Inventor: Nicholas C. Georgalis, 6981 Ivandale Rd., Independence, Ohio 44131

[21] Appl. No.: 43,863

[22] Filed: Jan. 7, 1987

Related U.S. Application Data

[63] Continuation of Ser. No. 697,070, Jan. 31, 1985, abandoned.

[51] Int. Cl.⁴ .............................. H04J 1/02; H04J 3/02
[52] U.S. Cl. ......................................... 370/124; 370/85
[58] Field of Search ................... 370/85, 124, 69.1, 86

[56] References Cited

U.S. PATENT DOCUMENTS

| | | | |
|---|---|---|---|
| 3,846,587 | 11/1974 | Schenkel et al. | 370/85 |
| 3,940,561 | 2/1976 | Heinze et al. | 370/85 |
| 4,004,099 | 1/1977 | Jones et al. | 370/85 |
| 4,262,171 | 4/1981 | Schneider et al. | 370/124 |
| 4,339,816 | 7/1982 | Reed | 370/124 |
| 4,513,413 | 4/1985 | Gorman et al. | 370/124 |
| 4,564,940 | 1/1986 | Yahata | 370/124 |

Primary Examiner—Douglas W. Olms

[57] ABSTRACT

This invention is a disbursed switching telecommunications system and includes a stable frequency source, a plurality of channels, signal means to derive a transit channel at a called station, and busy station indicating means.

10 Claims, 2 Drawing Sheets

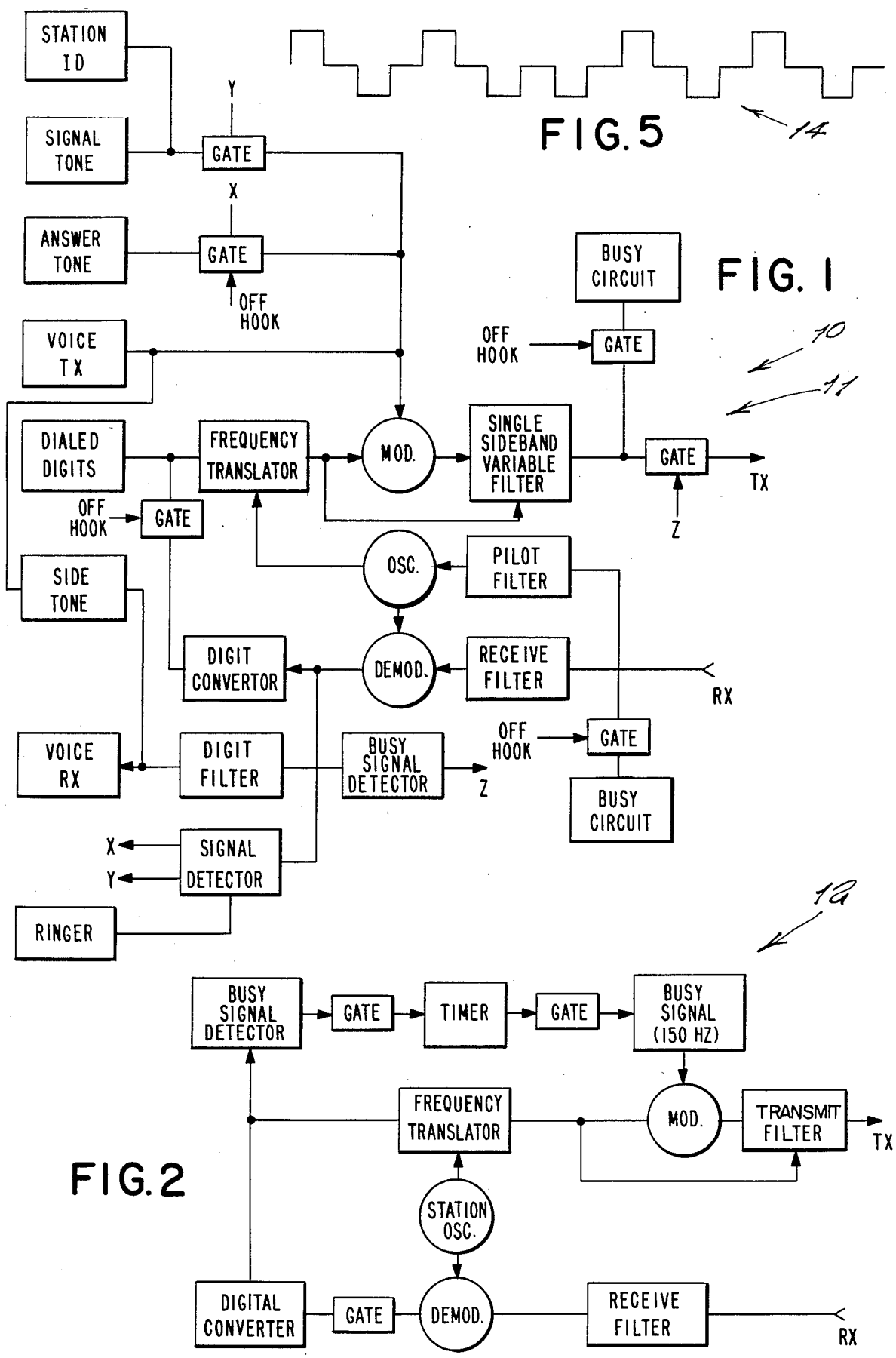

DISPERSED SWITCHING TELECOMMUNICATION SYSTEM

This application is a continuation of now abandoned application Ser. No. 697,070 filed Jan. 31, 1985.

This invention relates generally to telecommunication systems wherein a great many persons may individually, selectively intercommunicate with each other.

A conventional telecommunications system utilizes a central switch so as to interconnect stations. The connections are generally of narrow bandwidth (3.5 KHZ) and permit only one subscriber access to the central switching system for each connection. The central switching system may consist of several or a great many switching machines connected together in tandem. This conventional system is in need of improvement whereby a great many more subscribers may be more efficiently handled than at present.

A principal object of the present invention is to provide a dispersed switching telecommunications system, so as to accomplish a improved efficiency over existing systems.

Another object is to provide a dispersed switching telecommunications system, which can be constructed without a centralized switching machine by using a high capacity transmission means, such as coaxial cable or fiber optics.

Yet another object is to provide a dispersed switching telecommunications system wherein if an incoming call is attempted to a station in a busy state, the busy circuit can provide a call waiting signal to the called party which would permit the called party to place the first call on hold while answering the second call.

Other objects are to provide a dispersed switching telecommunications system, which is simple in design, inexpensive to manufacture, rugged in construction, easy to use, and efficient in operation.

These, and other objects, will be readily evident, upon a study of the following specification, and the accompanying drawing, wherein:

FIG. 1 is a block diagram of a frequency division multiplexing embodiment in accordance with this invention;

FIG. 2 is a block diagram of the frequency division multiplexing busy circuit;

FIG. 5 is a graph showing signals generated by the bipolar clock.

Figure 3:
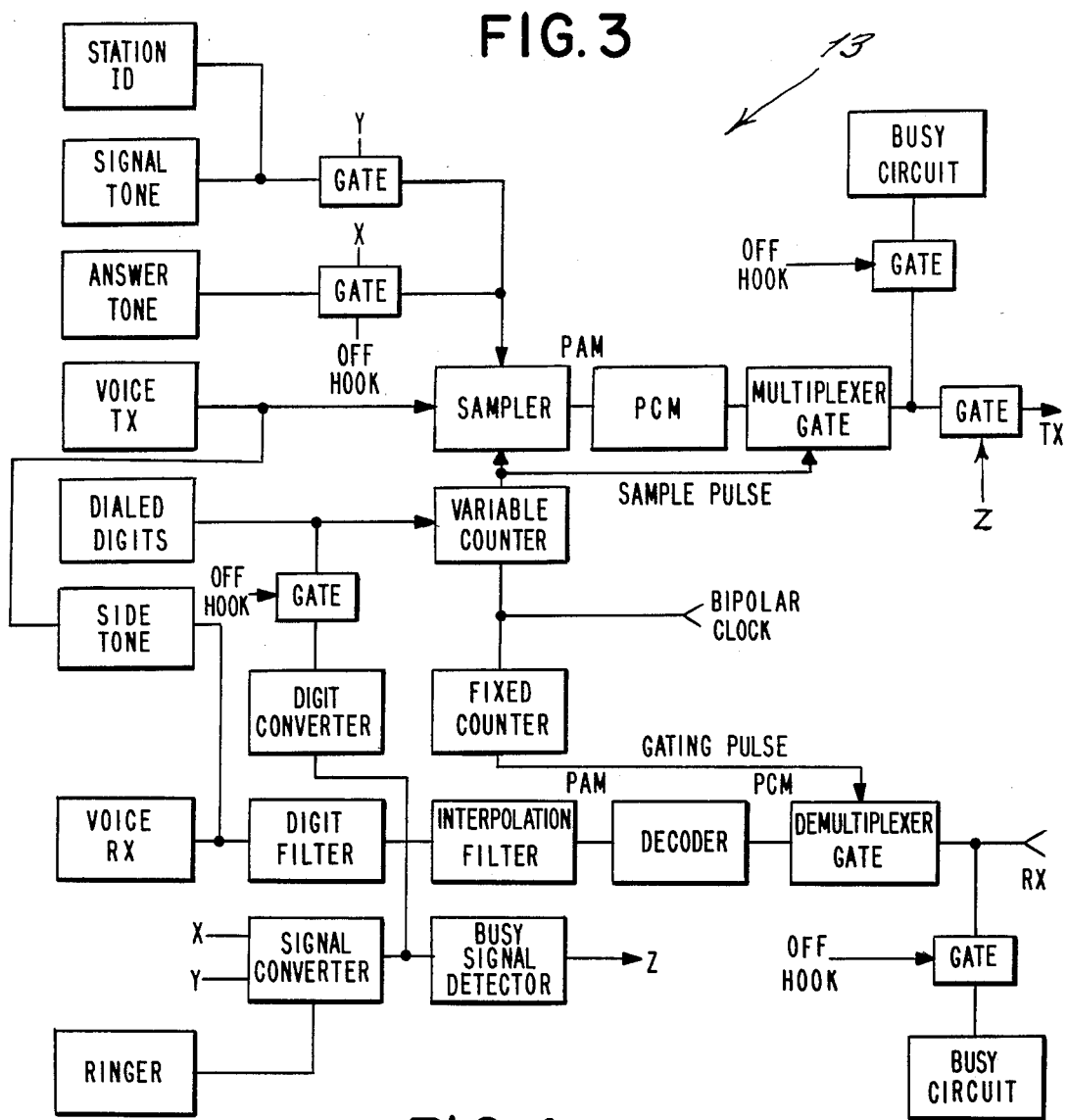
FIG. 3 is a block diagram of the time division multiplying station.
Figure 4:
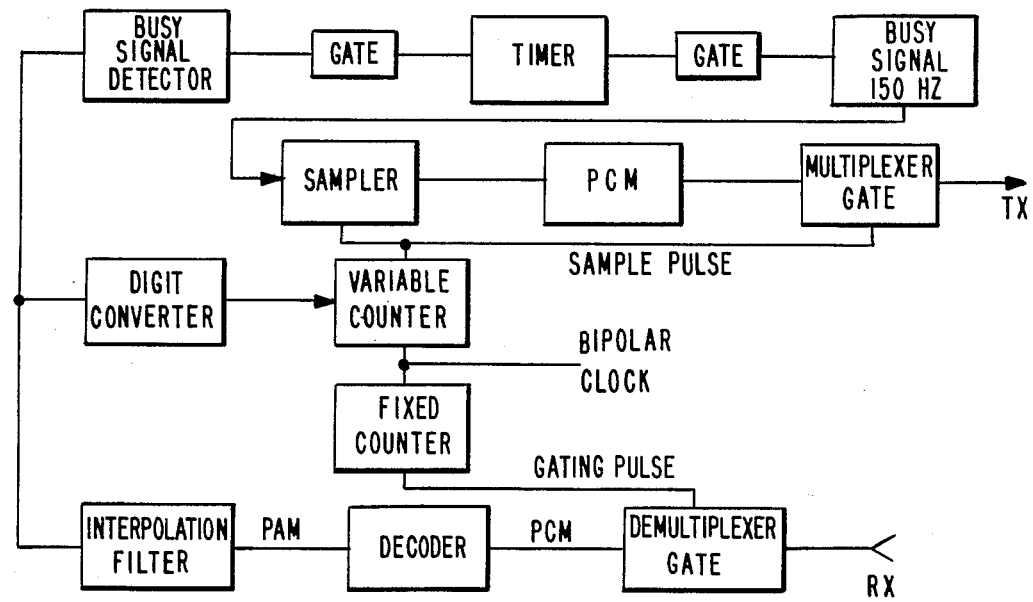
FIG. 4 is a block diagram of the time division multiplying busy circuit.

Referring now to the drawings in greater detail, and more particularly to FIG. 1 thereof, at this time, a dispersed switching telecommunications system 10 is shown to incorporate a frequency division multiplexing embodiment 11.

By utilizing high capacity transmission system such as coaxial cable or fiber optics a telecommunications system can be constructed without a centralized switching machine. If each subscriber is assigned a specific frequency in the bandwidth of a high capacity transmission system then through frequency division multiplexing and techniques described below, subscribers can communicate by tuning each other in. Similarly, if each subscriber is assigned a specific time slot in a time division multiplexing scheme, then subscribers can communicate by keying in to each others time slots.

In effect, the switching function performed by a central switching machine in a conventional telecommunication system becomes dispersed over the bandwidth of the transmission system. A coaxial cable system with a thirty-six television channel capacity could carry as many as fifty-four thousand simultaneous voice frequency subscribers using single sideband techniques.

The dispersed switching telecommunication system using the frequency division multiplexing embodiment illustrated in FIG. 1, operates in the following manner:

Each subscirber is assigned a specific receive frequency with a bandwidth of 4 KHZ. When a call is initiated the output of the frequency translator is tuned to the receive frequency of the station dialed. In addition, the busy circuit of the calling station is activated.

The station identification generator modulates the transmit carrier frequency alternately with the signaling tone. The modulation rate is below 300 Hz. The modulated carrier is passed through a single sideband filter which is tuned to the transmit frequency. At the called station the receive signal is demodulated and the signaling tone and transmitted identification digits are recovered. The signaling tone is used to activate a signaling device. The transmitted identification digits are used to tune the called station frequency translator, conditioning it to transmit to the calling station. An answer tone is generated by the called station which indicates to the calling station that signaling has taken place at the called station. When the called station goes off hook, the answer tone is interrupted and the called station busy circuit is activated. The interruption of the answer tone causes the signal tone and transmit ID generator to stop. The called station is now transmitting at the receive frequency of the calling station. If an incoming call is attempted while the station is in the busy state, the busy circuit detects the secondary calling station identification and tunes its frequency translator to the secondary calling station frequency. The output of the busy circuit frequency translator is modulated by a busy signal and transmitted to the second calling station. Simultaneously, the busy signal detector at the second calling station detects the busy signal and gates off the second calling station transmitter. This minimizes interference at the busy station. A filter in the receive frequency path blocks the station ID of the second calling station from interferring with the conversation.

Reference is now made to FIG. 2 wherein there is shown a block diagram of a busy circuit 12. As shown, when a station is in a busy state, the busy circuit is connected to the transmit and receive lines. Upon receiving a second calling station's identification signal, the busy circuit detects the signal, and conditions its frequency translator to transmit at the frequency of the second calling station. The busy signal is then transmitted for a predetermined time and then gates off. This prevent the clamping of the busy circuit so that it may respond to another call attempt.

Optionally, the busy circuit can provide a call waiting signal to the called party and this would permit the called party to place the first call on hold while answering the second call.

Reference is now made to operation of the system whe utilizing the time division multiplying embodiment 13 illustrated in FIG. 3.

The operation of the TDM station is the same as that of the FDM station. In the TDM scheme the analogue transmit signal is sampled at an 8 KHZ rate resulting in a pulse amplitude modulated (PAM) signal. The PAM signal is then converted to pulse code modulation (PCM) and the PCM signal is gated through the multiplexer gate at the appropriate time. The gating time is determined by the dialed digits which set the variable counter to the called station's time slot. The called station's time slot is determined by the fixed counter which gates the demultiplexer gate at a fixed time. Both the variable counter and fixed counter derive their clocks from a bipolar signal generated by the system clock. Bipolar violations (see FIG. 5) serve to reset the counters and maintain system synchronization. The receive PCM signal is decoded to a PAM signal which is passed through the interpolation filter. The output of the interpolation filter is the analogue signal originating from the calling station.

Reference is now made to the TDM busy circuit 12 shown in FIG. 5. The operation of the TDM busy circuit is the same as the FDM busy circuit. The TDM scheme is the same as that described for FIG. 3.

A comment is now here due in regards to connection of the present invention to external communication systems.

Connection of the dispersed switching telecommunications system to an external communications system such as the national telephone network can be accomplished by dedicating stations to a central operator position terminating external lines. The operator position will direct incoming calls to specific stations. Outgoing calls can go either through the operator position or by dialing a station dedicated to outgoing trunks.

Additionally, direct station inward dialing can be accomplished by dedicating stations to the direct inward dialing trunks. In both the direct outward calls and direct inward calls an interface device will be needed to convert signaling protocals between the dispersed switching telecommunications system and the external communications system.

While various changes may be made in the detail construction, it is understood that such changes will be within the spirit and scope of the present invention, as is defined by the appended claims.

What I now claim as new, is:

1. A dispersed switching, non-blocking full duplex, non-traffic sensitive telecommunications system comprising in combination a stable centralized frequency source and a plurality of stations connected to a transmission medium, each station including a receiver and a transmitter, the receiver of each station occupying a specifically predetermined frequency separated channel in the frequency spectrum of the transmission medium, each receiver comprising in part a fixed filter tuned to a preassigned frequency separated channel in the frequency spectrum of the transmission medium the bandwidth of the fixed filter determining the bandpass of the receiver, and the transmitter of each said station capable of automatically tuning to the receive frequency of the calling station upon reception of the calling stations' identification at the beginning of call set up; each station also including a means of indicating a busy station condition to a second calling station, the busy circuit consisting of a receiver, a transmitter and means for detecting the condition of said station, the receiver of the busy circuit occupying a frequency separated channel in the frequency spectrum of the transmission medium, each busy circuit receiver comprising in part a fixed filter tuned to a preassigned frequency separated channel in the frequency spectrum of the transmission medium, and the transmitter of said busy circuit capable of automatically tuning to the receive frequency of the second calling station whereby the busy circuit responds to the second calling station by transmitting a busy signal on the frequency separated channel occupied by the second calling station.

2. A communication system as set forth in claim 1 wherein said system includes a means of connecting to external communication systems.

3. A communication system as set forth in claim 2 wherein said system includes a means to provide a central operator position for manually directing and screening incoming calls from said external communication systems to at least one of said stations.

4. A communication system as set forth in claim 2 wherein said system includes a means to provide direct inward and direct outward station dialing without manual intervention from said external communication systems to at least one of said stations.

5. A communication system as set forth in claim 1 wherein said system includes a menas to provide optional call waiting and hold features at each station.

6. A dispersed switching, non-blocking, full duplex, non-traffic sensitive telecommunications system comprising in combination a stable centralized timing source and a plurality of stations connected to a transmission medium, each station including a receiver and a transmitter, the receiver of each station occupying a specifically predetermined time slot channel in the timing scheme of the system, each receiver comprising in part a demultiplexer gate which is controlled by a gating pulse supplied by a fixed counter, the time between successive gating pulses determining the bandpass of the receiver; each transmitter capable of automatically keying in to the receive time slot channel of the calling station by adjusting a variable counter to generate a sample pulse in the calling stations' receive time slot channel upon reception of the calling stations' identification at the beginning of call set up; each station also including a means of indicating a busy station condition to a second calling station, the busy circuit consisting of a receiver, a transmitter, and a means for detecting the condition of said station, the receiver of the busy circuit occupying a specifically predetermined time slot channel within the timing scheme of the system, the busy circuit receiver comprising in part a demultiplexer gate controlled by a gating pulse supplied by a fixed counter, and the transmitter of said busy circuit capable of automatically keying in to the receive time slot channel of the second calling station by adjusting the variable counter to generate a sample pulse in the second calling stations' receive time slot channel upon reception of the second calling stations' identification whereby the busy circuit responds to the second calling party by transmitting a busy signal on the time slot channel occupied by the second calling station.

7. A communication system as set forth in claim 6 wherein said system includes a means of connecting to external communication systems.

8. A communication system as set forth in claim 7 wherein said system includes a means to provide a central operator position for manually directing and screening incoming calls from said external communication systems to at least one of said stations.

9. A communication system as set forth in claim 7 wherein said system includes a means to provide direct inward and direct outward station dialing without manual intervention from said external communication systems to at least one of said stations.

10. A communication system as set forth in claim 6 wherein said system includes a means to provide optional call waiting and hold features at each station.

* * * * *